United States Patent [19]
DiMeo et al.

[11] Patent Number: 6,055,024
[45] Date of Patent: Apr. 25, 2000

[54] ADAPTIVE METHOD FOR Y-C SEPARATION IN VIDEO SIGNALS

[75] Inventors: Matthew J. DiMeo, San Diego; Benjamin E. Felts, III, Cardiff; John E. Welch, Encinitas, all of Calif.

[73] Assignee: Rockwell Semiconductor Systems, Inc., Newport Beach, Calif.

[21] Appl. No.: 09/146,057

[22] Filed: Sep. 2, 1998

[51] Int. Cl.[7] ............................... H04N 9/77; H04N 9/78
[52] U.S. Cl. ............................................ 348/668; 348/666
[58] Field of Search ..................................... 348/663, 665, 348/666, 667, 668, 712, 713; H04N 9/77, 9/78

[56] References Cited

U.S. PATENT DOCUMENTS

| | | | |
|---|---|---|---|
| 5,051,818 | 9/1991 | Mishima | 348/668 |
| 5,583,579 | 12/1996 | Shim | 348/668 |
| 5,627,600 | 5/1997 | Hatano et al. | 348/668 |
| 5,654,770 | 8/1997 | Hatano et al. | 348/668 |

*Primary Examiner*—John W. Miller
*Attorney, Agent, or Firm*—Fish & Richardson P.C.

[57] ABSTRACT

An adaptive method and system for processing luma and chroma signals from lines of a video signal. The invention includes an adaptive comb filtering algorithm that determines whether to average lines of video data based on the signal content. If two lines are dissimilar, a simple notch/bandpass system is used. The invention provides improved adaptive comb filtering performance at vertical transitions between high-luminance-detail areas and between other areas such as solid colors or flat gray or white fields by dynamically determining whether to average the chrominance information of the current video line with the chrominance information of the previous line, next line, both of such lines, or neither of such lines. In one aspect, the invention includes determining whether to average a current chroma value of a current video line with corresponding chroma values of the previous line, next line, or both of such lines, or neither of such lines; computing an output value for the current chroma value in response to such determination; determining a luminance correction from the current chroma value and the computed output value; and applying the luminance correction to a luma value corresponding to the current chroma value to correct any changes to the luma value.

25 Claims, 3 Drawing Sheets

|  | COLUMN | | |
|---|---|---|---|
| VIDEO LINE | C-1 | C | C+1 |
| L-2 | a | b | c |
| L-1 | d | e | f |
| L | g | * | i |
| L+1 | j | k | l |
| L+2 | m | n | o |

ADAPTIVE METHOD FOR Y-C SEPARATION IN VIDEO SIGNALS

TECHNICAL FIELD

This invention relates to electronic video systems, and more particularly to an adaptive method for Y-C separation in video signals.

BACKGROUND

The NTSC color video standard used in the U.S. and some other countries consists of luminance (brightness) information added to two modulated color difference (chrominance) subcarriers. Since the color carriers appear in a portion of the spectrum that lies within the bandwidth of the luminance, it can be difficult to separate the luminance data from the chrominance data with a minimum of mixing.

In particular, luminance information can be mistaken for color information, leading to so-called cross-luma artifacts, in which color appears in an image where it does not belong. Conversely, chrominance information can be treated as luminance, leading to cross-color artifacts, where high-frequency black-and-white bands appear instead of solid color.

The oldest method of separating luminance (Y) from chrominance (C) in a video signal is simply to use a notch filter on the composite signal to generate Y, and a bandpass filter to extract C. However, this leads to a loss of high-frequency detail and cross-luma artifacts.

More advanced comb filtering methods have been applied. These methods rely on the fact that the color subcarrier changes phase by 180° every line. Thus, by using a linear combination of chroma values between two lines (assuming that the two lines are sufficiently similar), luma information is averaged out but chroma information remains. A weighted average over multiple lines can also be used, a common scheme being (−0.25×previous line)+(0.5× current line)+(−0.25×next line).

However, note the caveat above about the lines to be averaged being "sufficiently similar". When two lines are not sufficiently similar, cross-luma artifacts occur at vertical transitions between high-frequency (i.e., detailed) luminance areas and between other areas such as solid colors or flat gray or white fields.

The inventors have determined that there is a need for an improved method for eliminating more of these types of artifacts in order to improve image quality. The present invention provides a method and system for achieving this end.

SUMMARY

The invention includes an adaptive comb filtering algorithm that determines whether to average lines of video data based on the signal content. If two lines are dissimilar, a simple notch/bandpass system is used. However, the invention provides improved adaptive comb filtering performance at vertical transitions between high-luminance-detail areas and between other areas such as solid colors or flat gray or white fields by dynamically determining whether to average the chrominance information of the current video line with the chrominance information of the previous line, next line, both of such lines, or neither of such lines.

In one aspect, the invention includes an adaptive method for processing luma and chroma signals from a video signal, including the steps of: determining whether to average a current chroma value of a current video line with corresponding chroma values of the previous line, next line, or both of such lines, or neither of such lines; computing an output value for the current chroma value in response to such determination; determining a luminance correction from the current chroma value and the computed output value; and applying the luminance correction to a luma value corresponding to the current chroma value to correct any changes to the luma value.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2 is a diagram showing a set of pixels values in adjacent lines of a video signal used in determining a Y-C separation algorithm in accordance with the invention.

Like reference numbers and designations in the various drawings indicate like elements.

DETAILED DESCRIPTION

The invention will be described in the context of a conventional image capture system that provides a series of decoded video image frames to a buffer memory of a computer system. The invention operates on the contents of the buffer memory to eliminate many visible artifacts in order to improve image quality. It should be noted that the invention can be used in other embodiments where there is a need for an adaptive method for Y-C separation in video signals.

Figure 1:
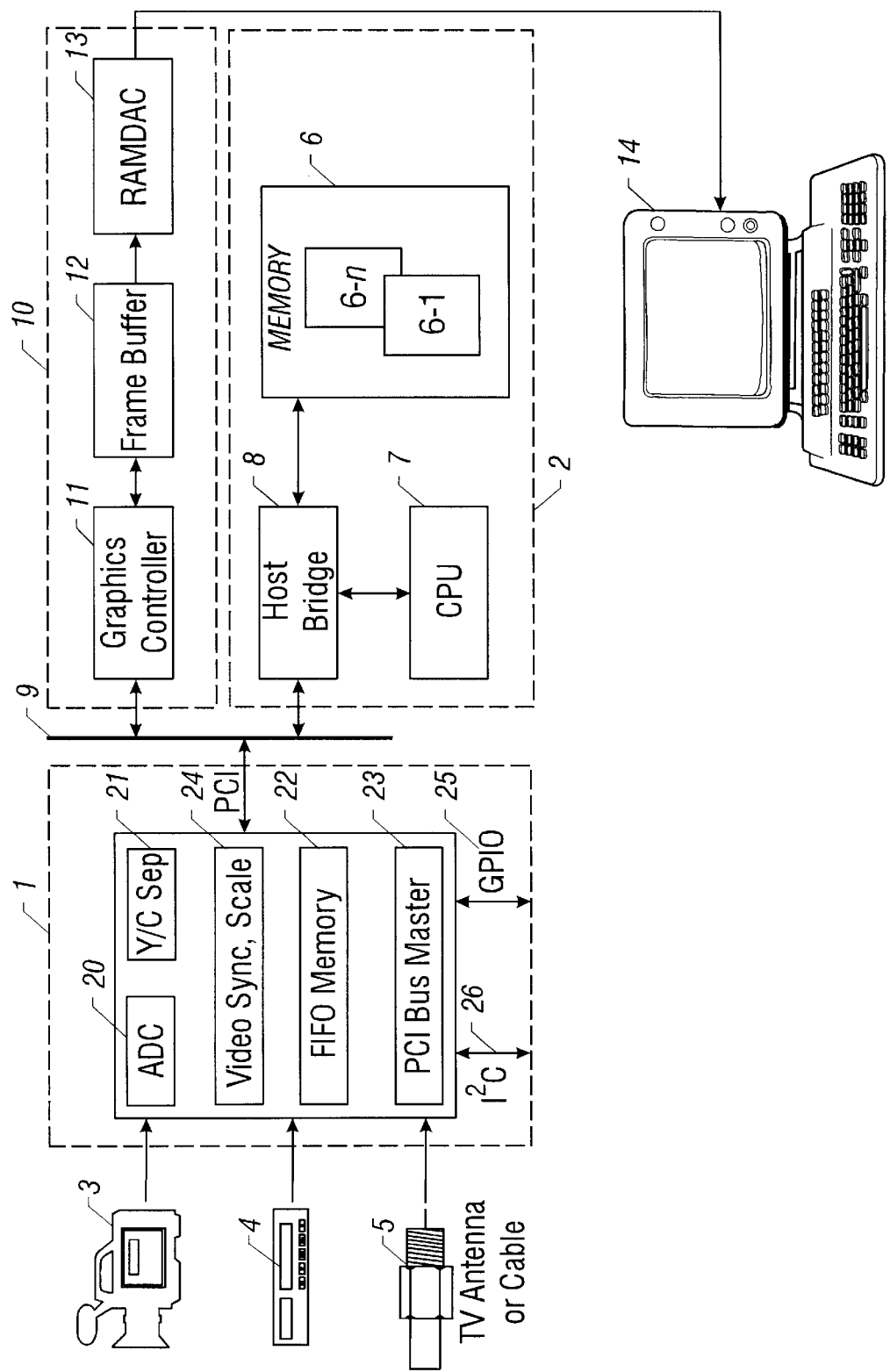
FIG. 1 is a block diagram of a prior art electronic video decoder system and computer system that may be used with the present invention.

FIG. 1 is a block diagram of a prior art electronic video decoder system 1 and computer system 2 that may be used with the present invention. Any of several video sources, such as a video camera 3, VCR 4, or television antenna or cable signal source 5 (which may be processed first through a tuner to select a distinct channel) are coupled to the video decoder system 1, which may be, for example, a Rockwell Semiconductor Systems Bt848A single-chip video capture processor and PCI Bus Master, available from Rockwell Semiconductor Systems, Newport Beach, Calif. The video decoder system 1 can place video data directly into the system memory 6 of the computer system 2 for video capture application. The computer system 2 includes the system memory 6, a central processing unit 7, and a host bridge 8 to couple the computer system to a conventional bus 9, such as the PCI Bus. The video decoder system 1 can also provide video data to a computer graphics adapter 10, which includes a graphics controller 11, a frame buffer 12, and a RAMDAC 13. The output of the video decoder system 1 is placed into a target area in the frame buffer 12 for video overlay applications, so that a video image stream may be displayed on a monitor 14.

The video decoder system 1 includes an analog-to-digital converter (ADC) 20 for converting the input video signal to a "raw" (unprocessed) digital format. In a "raw" mode, this digital information is temporarily stored in a first-in-first-out (FIFO) memory 22. A PCI Bus Master circuit 23 provides controlled transfer of "raw" digitized video frames over the bus 9 connecting the video decoder system 1 to the computer system 2. (Although the illustrated embodiment shows use of a PCI Bus, the invention is not limited to any particular bus). Control of the video decoder system 1 is provided through either a general purpose input/output port 25 or a two-wire inter-integrated circuit interface 26.

For purposes of the invention, the video decoder system 1 is used to place data for a series of still video frames 6-1 . . . 6-n directly into the system memory 6 of the computer system 2, as shown in FIG. 1. Each video frame includes data defining raster scan lines of video picture element (pixel) data. The pixel data represents digitally sampled values of the complex video signal for a particular raster scan position in a video frame. A preliminary Y/C separation is performed by appropriate processing of such data to generate separate luma (Y) and chroma (C) values for each pixel. One method of separating luminance from chrominance in a video signal is simply to use a notch filter to generate Y, and a bandpass filter to extract C. In the preferred embodiment, a computer implementation of the method described below is applied to each video frame to perform adaptive Y-C separation of the digitized video signal. The computer implementation preferably executes on the CPU 7 of the computer system 2.

The invention includes an adaptive comb filtering algorithm that determines whether to average lines of video data based on the signal content. If two lines are dissimilar, the initial luma and chroma values derived from application of the notch and bandpass filters are used. However, the invention provides improved adaptive comb filtering performance at vertical transitions between high-luminance-detail areas and between other areas such as solid colors or flat gray or white fields by dynamically determining whether to average the chrominance information of the current video line with the chrominance information of the previous line, next line, both lines, or neither of such lines.

In particular, the preferred embodiment of the invention examines three chroma samples from each of up to five lines of video data. FIG. 2 is a diagram showing a set of pixels values in adjacent lines of a video signal used in determining a Y-C separation algorithm in accordance with the invention. In FIG. 2, the symbol * represents the current chroma value being determined. The symbols a, b, c, d, e, f, g, i, j, k, l, m, n, and o represent a 15-pixel "neighborhood" of chroma values in the current line L, or in preceding (L−1, L−2) or following (L+1, L+2) lines, and in the current column C, or in the preceding column (C−1) or following column (C+1) relative to the current chroma value *.

Figure 3:
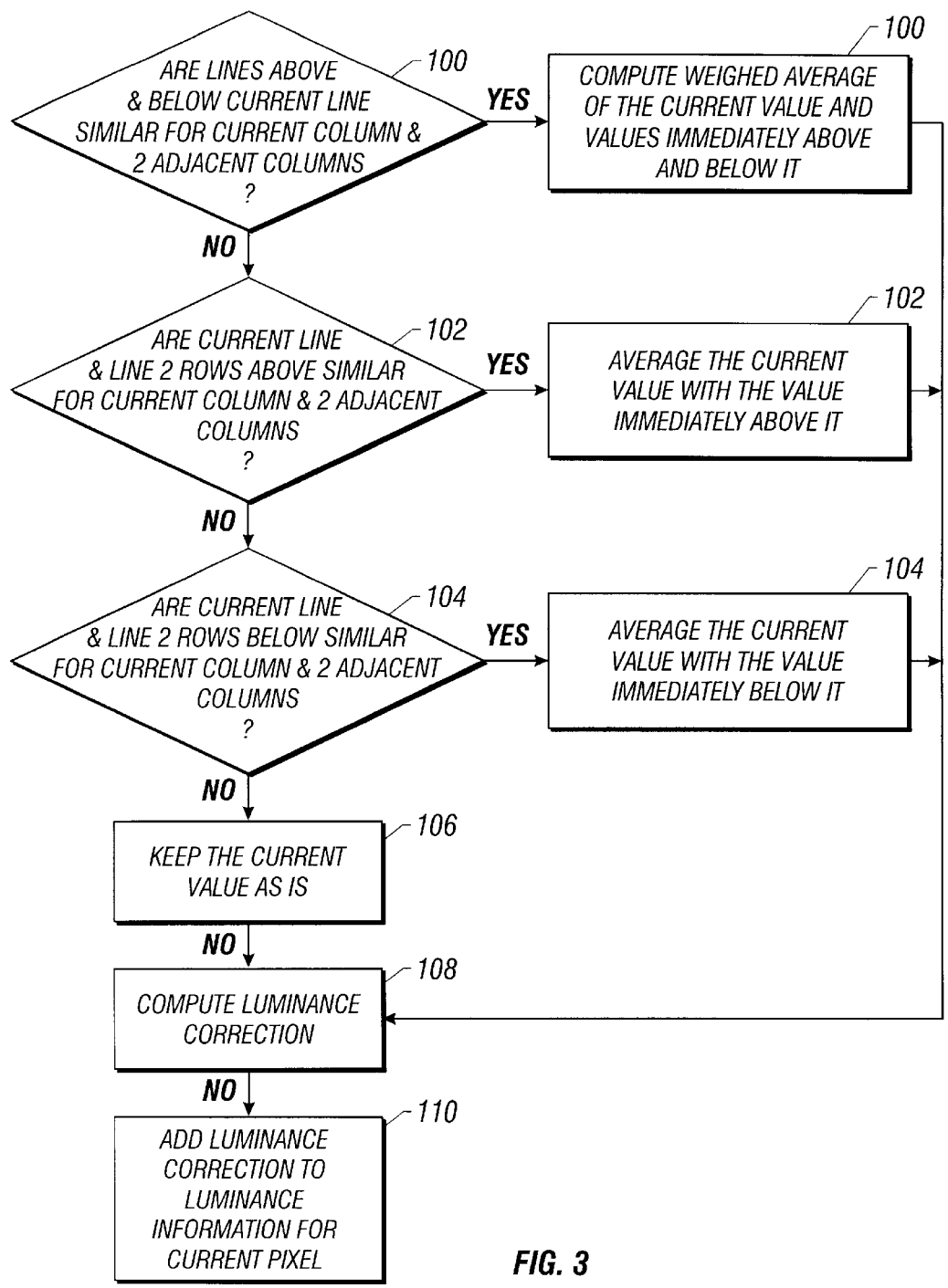
FIG. 3 is a flowchart of a preferred embodiment of the invention.

With respect to each current chroma value, the following processing is applied. Let the function $D(x,y)=|x-y|$, representing the absolute difference function of two "raw" (unprocessed) chroma values. Let T be a selected threshold value for degree of similarity or dissimilarity (the value for T may be empirically determined), and let O* be the output value for the processed current chroma value *. The preferred algorithm is then performed as shown in Table 1 and in FIG. 3, which is a flowchart of a preferred embodiment of the invention:

TABLE 1

| TEST | DESCRIPTION |
| --- | --- |
| IF D(d,j) < T AND D(e,k) < T AND D(f,l) < T, THEN | STEP 100: Check if line above and line below the current line are similar for each of the current column and two adjacent columns. If so, compute a weighted average of the current value and the |

TABLE 1-continued

| TEST | DESCRIPTION |
| --- | --- |
| O* = weighted average of −e, *, −k; | values immediately above and below it. The weighting may be, for example: O* = (0.25 × −e) + (0.5 × *) + (0.25 × −k) |
| ELSE IF D(a,g) < T AND D(b,*) < T AND D(c,i) < T, THEN O* = average of −e and *; | STEP 102: Check if the current line and the line 2 rows above the current line are similar for each of the current column and two adjacent columns. If so, average the current value with the value immediately above it. |
| ELSE IF D(g,m) < T AND D(*,n) < T AND D(i,o) < T, THEN O* = average of * and −k; | STEP 104: Check if the current line and the line 2 rows below the current line are similar for each of the current column and two adjacent columns. If so, average the current value with the value immediately below it. |
| OTHERWISE O* = *. | STEP 106: The current line is not similar enough to the lines above or below it. Keep the current value as is. |
| Luminance Correction = * − O* | STEP 108: After the new chrominance value O* is determined, it is subtracted from the original value*. |
| Add Luminance Correction to the luminance information for the current pixel. | STEP 110: This step allows luminance to pass through the adaptive comb filter unchanged. |

There are complications at the edges of a frame of chroma data. For example, for the top line, only the third IF clause is valid, and for the second line, only the first and third IF clauses are valid. Similarly, for the next to last line, only the first and second IF clauses are valid, and for the last line, only the second IF clause is valid. At the left edge, D(a,g), D(d,j), and D(g,m) are forced to zero. Similarly, at the right edge, D(f,l), D(c,i), and D(i,o) are forced to zero.

The invention performs far better at vertical transitions between high-frequency luminance areas and color field, and generally reduces cross-luma artifacts better than other solutions.

Implementation

Aspects of the invention may be implemented in hardware or software, or a combination of both. For example, the algorithms and processes of the invention can be implemented in one or more computer programs executing on programmable computers each comprising at least one processor, at least one data storage system (including volatile and non-volatile memory and/or storage elements), at least one input device, and at least one output device. Program code is applied to input data to perform the functions described herein and generate output information. The output information is applied to one or more output devices, in known fashion.

Each program may be implemented in any desired computer language (including but not limited to machine, assembly, high level procedural, or object oriented programming languages) to communicate with a computer system. In any case, the language may be a compiled or interpreted language. Each such computer program is preferably stored on a storage media or device (e.g., ROM, CD-ROM, tape, or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A hardware implementation of the algorithms and processes of the invention may be accomplished using known circuit technologies, such as discrete logic, programmable logic arrays, application specific integrated circuits, etc.

A number of embodiments of the present invention have been described. Nevertheless, it will be understood that various modifications may be made without departing from the spirit and scope of the invention. For example, two different threshold values (one for the middle pixel column, and another one for the two adjacent pixel columns) could be used instead of just one value. As another example, the order of the tests described above may be rearranged while still accomplishing the same or similar function. Accordingly, other embodiments are within the scope of the following claims.

What is claimed is:

1. An adaptive method for processing luma and chroma signals from lines of a video signal, including the steps of:
   (a) determining whether to average a current chroma value of a current video line with corresponding chroma values of the previous line, next line, both of such lines, or neither of such lines based on an indication of similarity of pixels in the neighborhood of the current chroma value;
   (b) computing an output value for the current chroma value in response to such determination;
   (c) determining a luminance correction from the current chroma value and the computed output value; and
   (d) applying the luminance correction to a luma value corresponding to the current chroma value to correct any changes to the luma value.

2. The method of claim 1, wherein the step of determining whether to average a current chroma value includes the steps of:
   (a) comparing chroma values adjacent to the current chroma value in a line above the current video line with corresponding chroma values adjacent to the current chroma value in a line below the current video line; and
   (b) indicating a similarity between the compared values in response to the comparing being below a selected threshold value.

3. The method of claim 2, further including the step of computing a weighted average of the current chroma value and the corresponding adjacent chroma values in the lines above and below the current video line in response to an indication of similarity.

4. The method of claim 1, wherein the step of determining whether to average a current chroma value includes the steps of:
   (a) comparing the current chroma value and at least one adjacent chroma value from the current video line with corresponding chroma values in a line spaced apart from the current video line; and
   (b) indicating a similarity between the compared values in response to the comparing being below a selected threshold value.

5. The method of claim 4, further including the step of computing an average of the current chroma value and the corresponding adjacent chroma value in a line adjacent to both the current video line and the spaced line in response to an indication of similarity.

6. The method of claim 1, wherein the step of determining whether to average a current chroma value includes the steps of:
   (a) comparing the current chroma value and at least one adjacent chroma value from the current video line with corresponding chroma values in a line two lines above the current video line; and
   (b) indicating a similarity between the compared values in response to the comparing being below a selected threshold value.

7. The method of claim 6, further including the step of computing an average of the current chroma value and the corresponding adjacent chroma value in the line above the current video line in response to an indication of similarity.

8. The method of claim 1, wherein the step of determining whether to average a current chroma value includes the steps of:
   (a) comparing the current chroma value and at least one adjacent chroma value from the current video line with corresponding chroma values in a line two lines below the current video line; and
   (b) indicating a similarity between the compared values in response to the comparing being below a selected threshold value.

9. The method of claim 8, further including the step of computing an average of the current chroma value and the corresponding adjacent chroma value in the line below the current video line in response to an indication of similarity.

10. The method of claim 1, wherein the step of determining a luminance correction from the current chroma value and the computed output value includes the step of computing the difference between the current chroma value and the computed output value.

11. The method of claim 1, wherein the step of applying the luminance correction to a luma value includes the step of adding the luminance correction to the luma value.

12. A system for processing luma and chroma signals from lines of a video signal, including:
   (a) a memory buffer in a computer system for storing at least one frame of video signal information, each frame comprising a plurality of lines of video pixel data, each pixel having a chroma value and a luma value;
   (b) a programmed processor in the computer system, coupled to the buffer memory, for:
      (1) determining whether to average a current chroma value of a current video line with corresponding chroma values of the previous line, next line, both of such lines, or neither of such lines based on an indication of similarity of pixels in the neighborhood of the current chroma value;
      (2) computing an output value for the current chroma value in response to such determination;
      (3) determining a luminance correction from the current chroma value and the computed output value; and
      (4) applying the luminance correction to a luma value corresponding to the current chroma value to correct any changes to the luma value.

13. The system of claim 12, wherein the programmed processor is further for:
   (a) comparing chroma values adjacent to the current chroma value in a line above the current video line with corresponding chroma values adjacent to the current chroma value in a line below the current video line; and
   (b) indicating a similarity between the compared values in response to the comparing being below a selected threshold value.

14. The system of claim 13, wherein the programmed processor is further for computing a weighted average of the current chroma value and the corresponding adjacent chroma values in the lines above and below the current video line in response to an indication of similarity.

15. The system of claim 12, wherein the programmed processor is further for:
   (a) comparing the current chroma value and at least one adjacent chroma value from the current video line with corresponding chroma values in a line spaced apart from the current video line; and
   (b) indicating a similarity between the compared values in response to the comparing being below a selected threshold value.

16. The system of claim 15, wherein the programmed processor is further for computing an average of the current chroma value and the corresponding adjacent chroma value in a line adjacent to both the current video line and the spaced line in response to an indication of similarity.

17. The method of claim 12, wherein determining a luminance correction from the current chroma value and the computed output value includes computing the difference between the current chroma value and the computed output value.

18. The method of claim 12, wherein applying the luminance correction to a luma value includes adding the luminance correction to the luma value.

19. A computer program, residing on a computer-readable medium, for processing luma and chroma signals from lines of a video signal stored in a buffer memory of a computer, the computer program comprising instructions for causing a computer to:
   (a) determine whether to average a current chroma value of a current video line with corresponding chroma values of the previous line, next line, both of such lines, or neither of such lines based on an indication of similarity of pixels in the neighborhood of the current chroma value;
   (b) compute an output value for the current chroma value in response to such determination;
   (c) determine a luminance correction from the current chroma value and the computed output value; and
   (d) apply the luminance correction to a luma value corresponding to the current chroma value to correct any changes to the luma value.

20. The computer program of claim 19, wherein the instructions further include instructions for causing the computer to:
   (a) compare chroma values adjacent to the current chroma value in a line above the current video line with corresponding chroma values adjacent to the current chroma value in a line below the current video line; and
   (b) indicate a similarity between the compared values in response to the comparing being below a selected threshold value.

21. The computer program of claim 20, wherein the instructions further include instructions for causing the computer to compute a weighted average of the current chroma value and the corresponding adjacent chroma values in the lines above and below the current video line in response to an indication of similarity.

22. The computer program of claim 19, wherein the instructions further include instructions for causing the computer to:
   (a) compare the current chroma value and at least one adjacent chroma value from the current video line with corresponding chroma values in a line spaced apart from the current video line; and
   (b) indicate a similarity between the compared values in response to the comparing being below a selected threshold value.

23. The computer program of claim 22, wherein the instructions further include instructions for causing the computer to compute an average of the current chroma value and the corresponding adjacent chroma value in a line adjacent to both the current video line and the spaced line in response to an indication of similarity.

24. The computer program of claim 19, wherein the instructions for causing the computer to determine a luminance correction from the current chroma value and the computed output value further include instructions for causing the computer to compute the difference between the current chroma value and the computed output value.

25. The computer program of claim 19, wherein the instructions for causing the computer to apply the luminance correction to a luma value further include instructions for causing the computer to add the luminance correction to the luma value.

* * * * *